Figure 1:
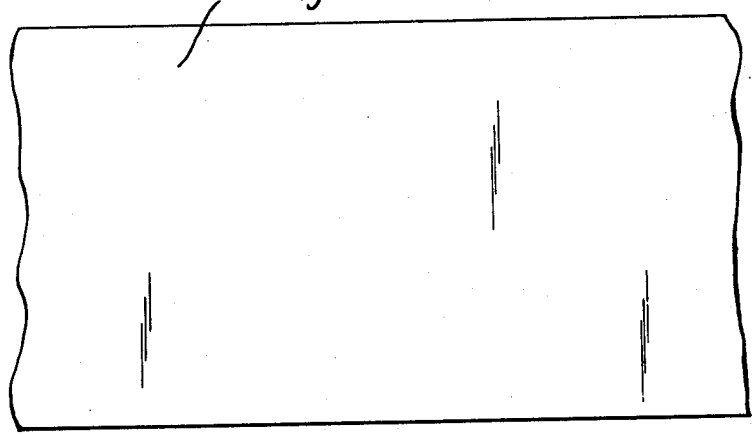

May 17, 1960     W. E. WALLES     2,937,066
METHOD FOR TREATING POLYETHYLENE AND TREATED
POLYETHYLENE ARTICLES THEREBY OBTAINED
Filed Nov. 23, 1955

INVENTOR.
Wilhelm E. Walles
BY
Griswold & Burdick
ATTORNEYS

United States Patent Office 2,937,066
Patented May 17, 1960

2,937,066

METHOD FOR TREATING POLYETHYLENE AND TREATED POLYETHYLENE ARTICLES THEREBY OBTAINED

Wilhelm E. Walles, Midland, Mich., assignor to The Dow Chemical Company, Midland, Mich., a corporation of Delaware Application November 23, 1955, Serial No. 548,728

The terminal portion of the term of the patent subsequent to April 28, 1975, has been dedicated to the Public 12 Claims. (Cl. 8—4)

This invention relates to a method for treating polyethylene and shaped articles comprised of polyethylene or polyethylene compositions so as to overcome their propensity for accumulating static electrical charges and to render them more susceptible to being colored by dyestuffs. It also has reference to polyethylene articles resulting from such a treatment.

Polyethylene has many attractive properties which make it desirable for employment in various shaped articles including fibers, filaments, yarns, threads (and fabrics constructed therefrom), ribbons, tapes, foils, films, sheets, moldings and the like. Shaped articles from polyethylene, however, as well as the powders, pellets and the like which may be employed in the fabrication of such shaped articles, are not readily adaptable to being colored by conventional dyestuffs. In order to successfully color polyethylene articles, it is usually necessary to incorporate pigments and the like into the polyethylene compositions which are employed for the article before its formation. In addition, polyethylene articles exhibit an inordinate capacity for accumulating surface charges of static electricity. This characteristic makes them extremely difficult and unwieldly to manipulate and handle during various manufacturing operations and use applications. It also lessens their attractiveness in other aspects for being employed for many purposes. For example, many individuals may object to the delitescent electrical shocks they may be subject to or to the sparks that may be discharged when they serve as the effective grounding means for polyethylene articles when there is a considerable accumulation of electrical charges on the articles. Furthermore, electrostatically charged polyethylene articles display great tendencies to collect dust and dirt and to have undesirably high degrees of soil retentivity. This of course limits their adaptability for being utilized for many decorative and other uses.

It is among the principal objects of the present invention to provide a method for treating polyethylene articles to improve their surface characteristics so that they do not develop static electrical charges and are capable of being colored by dyestuffs. It is among the ancillary objects of the present invention to provide polyethylene articles which result from such a treatment. It is a predominating objective of the present invention to accomplish these intendments without detraction from or deletion of the other desirable characteristics and properties of polyethylene.

According to the present invention, all or any desired portion of the surface of polyethylene or a polyethylene article may be made more conductive of electricity so as to render it less propense to accumulate static electrical charges and may also be made dye-receptive so that it is susceptible to being colored by common dyestuffs by a treatment which comprises subjecting the surface of the polyethylene or polyethylene article to the action of a sulfonating reagent selected from the group consisting of concentrated sulfuric acid containing at least about 98 percent by weight of $H_2SO_4$; oleum; and anhydrous solutions of oleum. The treatment, if it is carefully conducted, has no adverse effect on pigments and other additaments such as stabilizers and like which may be dispersed throughout the polyethylene for various purposes. After the treatment, the surface may be washed clean with water or other agents and the treated product employed satisfactorily in any application wherein it is advantageous for it to be substantially free from surface accumulation of static electrical charges. Or, if desired, the polyethylene or polyethylene article may be dyed with many dyestuffs, particularly basic dyestuffs, so as to be colored on its surface and to present a colored appearance.

The treatment of the present invention sulfonates the surface of the polyethylene or polyethylene article to render it relatively more conductive to electricity than it is when in an untreated state and to more readily accommodate the attachment of dyestuffs in order to secure a desired coloration in the polyethylene or polyethylene article. A surface which is more electrically conductive is relatively more anti-static in nature in that it tends less to accumulate charges of static electricity.

While the treatment may be accomplished with any of the sulfonating agents of the present invention, it is usually more advantageous to employ oleum (which is sometimes known as fuming sulfuric acid) which contains from trace amounts to about 10 percent by weight of dissolved, free sulfur trioxide. If desired, the oleum can also be employed advantageously in anhydrous solutions with other materials such as acetic anhydride and the like which permit equivalent effective quantities of the sulfur trioxide to be available as are provided in the oleum.

Generally a satisfactory degree of treatment or surface modification of the polyethylene article may be obtained when operating at temperatures between the freezing point of the sulfonating reagent and about 150° C. for periods of time ranging from matters of merely several seconds or even almost instantaneous periods which involve mere fractions of seconds to hours. Frequently when an oleum is employed which contains dissolved, free sulfur trioxide in amounts ranging from traces to about 10 percent by weight, the treatment may be performed suitably at an operating temperature of about 50° C. within a time period of about five minutes.

The results which may be obtained in any particular instance are somewhat interdependent on the nature of the polyethylene and the specific physical structure in which it is being treated, the strength or effective sulfur trioxide concentration of the reagent, the operating temperature and the length of the treatment. Care should be taken to avoid treating conditions which may be too strong, as may occur when an oleum is employed with a relatively high free sulfur trioxide content at too high a temperature or for too long a period of time. Care should also be taken to employ more moderate treating conditions upon more delicate structures such as powders, fine filaments or fibers and the like. If such precautions are not assiduously observed, the polyethylene article may be caused to decompose and degrade resulting in its being darkened and discolored to an intolerable extent. Conversely, the invention can not be suitably practiced with overly weak treating conditions which may not sufficiently modify the surface of the polyethylene article to produce a marked and significant enhancement in its anti-static characteristics or to improve its dye-receptivity.

Any desired degree of treatment may be effected. Generally, within the limits of beneficial operating conditions, longer or more intense treatments yield products having greater degrees of anti-static characteristics and dye-receptive properties. It is possible, for example, to treat a polyethylene article so as to render its surface sufficiently electrically conductive so as to be substantially completely anti-static in character and to have the highest possible affinity for dyestuffs which may be attained with such a surface. While any dyestuff which can react with the sulfonate groups on the treated polyethylene surface may be employed for coloring the treated product, it is preferable to use such basic dyestuffs for this purpose as basic aniline and basic anthraquinone dyes and the like.

The treatment may advantageously be performed on polyethylene in such unfabricated forms as powders and pellets which may be employed for extrusion and molding as well as on fabricated articles including fibers, filaments, yarns, threads, ribbons, tapes, foils, films, sheets, moldings and the like and on materials constructed therefrom such as cloth and fabrics from textile fibers, filaments and the like of polyethylene. As indicated, an entire surface need not be treated on such fabricated articles as films and moldings or on other articles. If it is not desired or required to obtain the benefit of a complete anti-static and dye-receptive surface, only certain preferred areas or portions of a surface that may, for example, be conformed to certain letters, legends or other shapes may be subjected to the sulfonating reagent to result in a localized improved dye-receptivity and conductivity on the surface.

In this connection, it may sometimes be desirable for treated and dyed polyethylene powders to be employed as color concentrate stocks for mixing with untreated powders which may then be employed for the fabrication of polyethylene articles. In this way, a desired coloration can be obtained readily and conveniently in the finally fabricated article. Polyethylene articles treated according to the invention also have improved characteristics for the retention of metals which may be deposited on their surface by various known techniques including deposition from readily reducible salt solutions of the desired metal and by volatilization and condensation of the metal under extremely low absolute pressures, or by known metal spraying processes.

Figure 2:
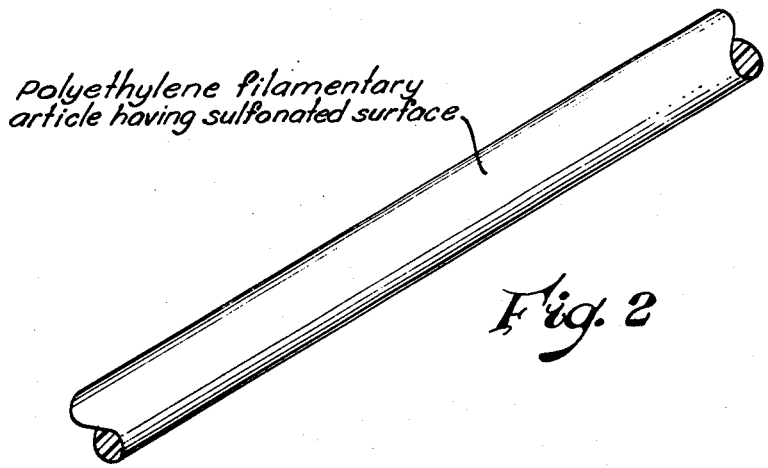

In the annexed drawing there is schematically illustrated a sheet in Figure 1 and a filament in Figure 2 as being typical polyethylene articles whose surfaces may advantageously be sulfonated in accordance with the present invention. The following examples are given to further illustrate the invention.

EXAMPLE I

A colored fabric woven from a pigmented polyethylene monofilament was immersed in an 8 percent oleum (which contains about 8 percent by weight of free sulfur trioxide dissolved in $H_2SO_4$) at a temperature of about 50° C. for about five minutes, after which it was washed with water and dried. The treated fabric did not show any tendency to accumulate significant static electrical charges when it was grounded and mechanically manipulated under prevailing atmospheric conditions of about 40 percent relative humidity. In a similar comparison, the untreated fabric became highly charged with static electricity.

This was more positively indicated by a series of tests on the above treated sample and on other samples treated with the same reagent at about 50° C. for different periods of time and with an untreated sample of the fabric to measure the relative electrical conductivities of the various samples. In the tests, an electroscope having a charge of about 1,000 volts was discharged through the samples to a connection with ground. The time required for discharging the electroscope in each case was a measure of the relative conductivity of each of the samples. More conductive samples, with shorter discharge times, have less tendency to accumulate charges of static electricity on their surfaces. The results of the test are reproduced in the following table.

RELATIVE ELECTRICAL CONDUCTIVITY OF TREATED POLYETHYLENE FABRIC SAMPLES

| Sample No. | Treatment time with 8 percent oleum at 50° C., min. | Relative conductivity in seconds required to discharge electroscope |
|---|---|---|
| 1 | Untreated | Over 5,000 |
| 2 | 5 | 240 |
| 3 | 10 | 60 |
| 4 | 15 | 30 |
| 5 | 50 | 0 |

EXAMPLE II

A polyethylene film was treated at about 50° C. with an 8 percent oleum reagent for a period of about five minutes, after which it was washed in water and immersed in an aqueous dyebath consisting of about 0.1 percent by wt. of Crystal Violet, a basic dyestuff. The temperature of the dyebath was about 75° C. The treated film was immersed for about ten minutes in the dyebath before being rinsed in warm water and dried. An intense, fast coloration of the film resulted. Analogous good results were obtained with such dyes as Malachite Green, Brilliant Green and Chrysoidine on polyethylene films and on such other forms of polyethylene as powders, monofilaments and moldings.

EXAMPLE III

Results similar to those in the foregoing examples were obtained when polyethylene films were treated in a similar manner with reagents comprised of 3 and 4 percent oleum at a temperature of about 50° C. for about ten minutes and with 100 percent sulfuric acid at the same temperature for about an hour.

Since certain changes and modifications can readily be entered into in the practice of the present invention without departing substantially from its intended spirit and scope, it is to be fully understood that all of the foregoing description and specification be interpreted as being merely illustrative of certain of its preferred embodiments and not construed as being limiting or restrictive of the invention excepting as it is set forth and defined in the appended claims.

What is claimed is:

1. Method for treating polyethylene articles to render them dye-receptive and to improve their anti-static characteristics which comprises subjecting the surface of the polyethylene article to a sulfonating reagent which is selected from the group consisting of concentrated sulfuric acid containing at least about 98 percent by weight of $H_2SO_4$; oleum; and anhydrous solutions of oleum at a temperature between the freezing point of the reagent and about 150° C.; continuing said treatment for a period of time ranging from several seconds to several hours in inverse ratio to the strength of the reagent and inversely proportionally to the treating temperature employed.

2. Method for treating polyethylene articles to render them dye-receptive and to improve their anti-static characteristics which comprises subjecting the surface of the polyethylene article to a sulfonating reagent which is selected from the group consisting of concentrated sulfuric acid containing at least about 98 percent by weight of $H_2SO_4$; oleum; and anhydrous solutions of oleum at a temperature between the freezing point of the reagent and about 150° C.; continuing said treatment for a period of time ranging from several seconds to several hours in inverse ratio to the strength of the reagent and inversely proportionally to the treating temperature employed; washing the treated article free of the reagent in water; and drying the treated article.

3. The method of claim 2 wherein the reagent is comprised essentially of oleum.

4. The method of claim 2 wherein the reagent is comprised essentially of oleum which contains from trace amounts to about 10 percent by weight of dissolved, free sulfur trioxide.

5. The method of claim 2 wherein the reagent is comprised essentially of oleum which contains between about 3 and about 8 percent by weight of dissolved, free sulfur trioxide and the surface of the polyethylene article is subjected to the oleum at a temperature of about 50° C. for at least about five minutes.

6. The method recited in claim 2 and including the step of subjecting the treated and washed article to a dyebath.

7. The method recited in claim 2 and including the step of subjecting the treated and washed article to a bath of a basic dyestuff.

8. Solid polyethylene which is characterized in having its surface electrically conductive and substantially free from accumulations of static electrical charges and being receptive to dyestuffs, said surface being comprised of sulfonated polyethylene.

9. A solid fabricated polyethylene article which is characterized in having its surface electrically conductive and substantially free from accumulations of static electrical charges and being receptive to dyestuffs, said surface being comprised of sulfonated polyethylene.

10. An article in accordance with claim 9 and containing an attached dyestuff on its surface.

11. A film of superficially sulfonated polyethylene in accordance with claim 9.

12. A filamentary article of superficially sulfonated polyethylene in accordance with claim 9.

References Cited in the file of this patent

UNITED STATES PATENTS

| | | |
|---|---|---|
| Re. 24,062 | Horton | Sept. 20, 1955 |
| 2,400,720 | Staudinger et al. | May 21, 1946 |
| 2,548,853 | Baker | Apr. 17, 1951 |
| 2,832,696 | Walles | Apr. 29, 1958 |

OTHER REFERENCES

Amer. Dyestuff Reporter, Feb. 15, 1954 (pp. 93–96).